United States Patent
Cheng

(10) Patent No.: US 9,465,796 B2
(45) Date of Patent: Oct. 11, 2016

(54) APPARATUS AND METHOD FOR DYNAMICALLY UPDATING LANDMARKS IN A SPACE DURING EXECUTION OF NATURAL LANGUAGE INSTRUCTIONS

(71) Applicant: SYMBOL TECHNOLOGIES, INC., Lincolnshire, IL (US)

(72) Inventor: Yan-Ming Cheng, Inverness, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 25 days.

(21) Appl. No.: 14/556,936

(22) Filed: Dec. 1, 2014

(65) Prior Publication Data

US 2016/0154791 A1      Jun. 2, 2016

(51) Int. Cl.
  *G06F 17/27* (2006.01)
  *G06F 17/20* (2006.01)
  *G06F 17/28* (2006.01)

(52) U.S. Cl.
  CPC ........... *G06F 17/2785* (2013.01); *G06F 17/28* (2013.01)

(58) Field of Classification Search
  None
  See application file for complete search history.

(56) References Cited

U.S. PATENT DOCUMENTS

| | | | |
|---|---|---|---|
| 7,831,433 B1 | 11/2010 | Belvin et al. | |
| 2005/0251324 A1* | 11/2005 | Wiener | G01C 21/32 701/414 |
| 2007/0250212 A1* | 10/2007 | Halloran | A47L 5/30 700/245 |
| 2011/0276264 A1* | 11/2011 | Plocher | G01C 21/206 701/533 |

FOREIGN PATENT DOCUMENTS

| | | |
|---|---|---|
| CA | 2812723 A1 | 3/2012 |
| WO | 2004059900 A2 | 7/2004 |
| WO | 2008005052 A2 | 1/2008 |

OTHER PUBLICATIONS

Thomas Kollar et al.; "Toward Understanding Natural Language Directions" 2010, pp. 259-266.
Felix Duvallet et al.; "Imitation Learning for Natural Language Direction Following Through Unknown Environments": May 2013, pp. 1-7.
Francis J. et al.; "MetaBot: Automated and Dynamically Schedulable Robotic Behaviors in Retail Environments": Oct. 21-23, 2013, pp. 148-153.
Trahanias P.E. et al.; "Visual Landmark Extraction and Recognition for Autonomous Robot Navigation"; Sep. 7-11, 1997, pp. 1036-1043 vol. 2.
Stanislao Lauriaa et al.; "Robotics and Autonomous Systems" vol. 38, issues 3-4, Mar. 2992, pp. 171-181.

* cited by examiner

*Primary Examiner* — Marcus T Riley

(57) ABSTRACT

A computing device obtains an incomplete semantic map of a predefined space. The incomplete semantic map includes static landmarks. The computing device receives a set of natural language instructions including a sequence of semantically directive clauses, processes the sequence of semantically directive clauses, decodes one of an action and a path in the set of natural language instructions using an optimization process and based on the incomplete semantic map. In response to the decoding, the computing device inserts a newly identified landmark into the incomplete semantic map.

18 Claims, 4 Drawing Sheets

APPARATUS AND METHOD FOR DYNAMICALLY UPDATING LANDMARKS IN A SPACE DURING EXECUTION OF NATURAL LANGUAGE INSTRUCTIONS

BACKGROUND OF THE INVENTION

In some environments, some tasks are suitable to being performed by a robot. However, collaboration between the robot and a human is an important factor in effectively performing certain tasks. For instance, in a retail environment, having a human direct the operations of a robot is an important factor in effectively performing certain tasks. Consider an example where a robot is employed to obtain items from a retail store for a customer. In this example, if a customer wants to purchase an item, a human, for example, a store employee or the customer may instruct the robot on where to travel in the retail space to retrieve the item. For example, the human may provide directional instructions to the robot to go down a specific aisle and make turns at specific landmarks in order retrieve the item. In current implementations, the human directing the robot is a trained professional with understanding of how to operate the robot. For example, the human directing the robot may be trained to program the robot. Such training substantially increases the cost for operating the robot.

It is therefore desirable to create a system which is capable of translating conversational instructions (referred to herein as natural language instructions) of directions and task execution into robot programming language/instructions. For instance, the system should be capable of translating natural language instructions provided by a robot operator (for example, a retail worker) into robot programming instructions, without requiring that the robot operator have specialized training. The robot operator may instruct the robot using conversational instructions to, for example, "go straight; then turn right at Aisle 3 to help a customer," or "go through this door, turn left before you hit the wall to pick up bananas, and come back to fill the banana bins." For the robot to carry out the conversational instructions, the robot must have a map/geographical layout of a space in which the robot is to operate. The geographical layout of, for example, a retail space may include landmarks, such as, the locations of doors, elevators, sections, signs, an information desk, displays, and/or stands. Some of the landmarks, such as, the doors or windows are static, i.e., these landmarks cannot be easily changed. Other landmarks, such as, the location of a flower stand or a drink display are dynamic, i.e., these landmarks can be easily changed. Without an accurate geographical layout of a space where both the static and dynamic landmarks clearly identified, it is difficult to translate natural language instructions provided by the robot operator into robot programming instructions that can be implemented by the robot. Some current implementations therefore provide a detailed geographical layout of a space, with all static and dynamic landmarks clearly defined. The problem with providing the detailed geographical layout of a space is when dynamic landmarks are added or removed from the space, the detailed geographical layout of the space must be updated before the robot can accurately carry out directional instructions.

Accordingly, there is a need for an improved method and apparatus for dynamically updating landmarks in a geographical layout during execution of natural language instructions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
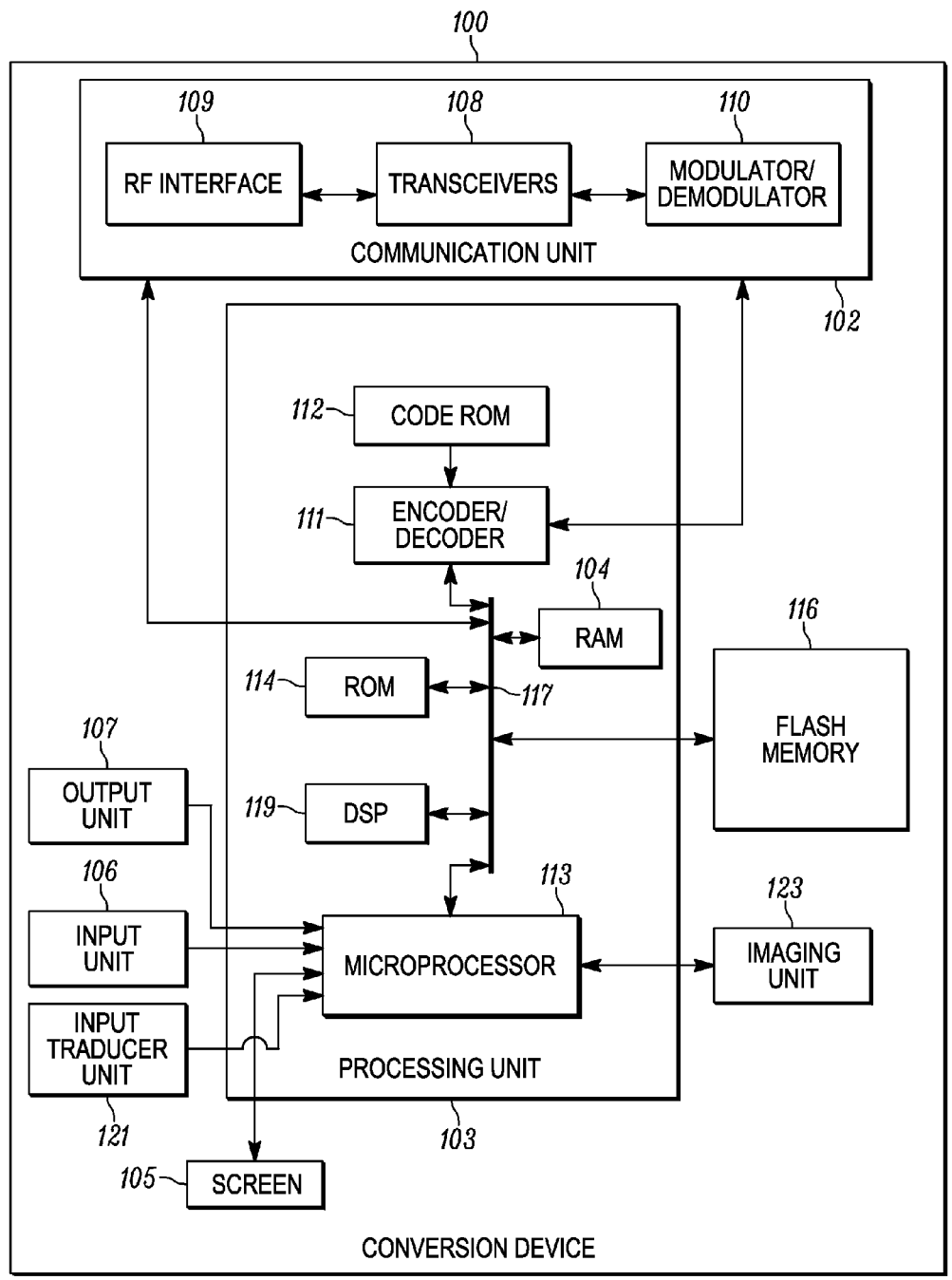
FIG. 1 is a block diagram of a conversion device that is configured to dynamically update landmarks in a geographical layout during execution of natural language instructions in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for dynamically updating landmarks in a geographical layout during execution of natural language instructions. A computing device obtains an incomplete semantic map of a predefined space. The incomplete semantic map includes static landmarks. The computing device receives a set of natural language instructions including a sequence of semantically directive clauses, processes the sequence of semantically directive clauses, and decodes one of an action and a path in the set of natural language instructions using an optimization process and based on the incomplete semantic map. In response to the decoding, the computing device inserts a newly identified landmark into the incomplete semantic map.

A conversion device 100 is configured to dynamically update landmarks in a geographical layout during execution of natural language instructions. While conversion device 100 is executing the natural language instructions, conversion device 100 is configured to add new semantic landmarks/references into the geographical layout in response to exploring the geographical layout and/or in response to interaction with an operator of conversion device 100. For instance, conversion device 100 may add new semantic landmarks into a conventional retail floor map through exploration and/or natural language dialogue with an operator, thereby converting an incomplete retail floor map into a detailed map of a retail store. An incomplete and/or a detailed map used by conversion device 100 may be shared with and/or updated by other conversion devices operating in the same environment.

FIG. 1 is a block diagram of a conversion device 100 that is configured to dynamically update landmarks in a geographical layout during execution of natural language instructions in accordance with some embodiments. Conversion device 100 may be a computing device, for example, a robot, a mobile or stationary computer or smart phone. Conversion device 100, for example, may include a communications unit 102 coupled to a common data and address bus 117 of a processor 103. Conversion device 100 may also include an input unit (e.g., keypad, pointing device, etc.) 106, an output transducer unit (e.g., speaker) 107, an input transducer unit (e.g., a microphone) (MIC) 121, and a display screen 105, each coupled to be in communication with the processor 103. Conversion device 100 may also include a imaging unit 123 (e.g., a camera or a scanner) coupled to be in communication with the processor 103, configured to capture information about a landmark/reference and to identify the landmark/reference in an environment.

The processor 103 may include, that is, implement, an encoder/decoder 111 with an associated code read-only memory (ROM) 112 for storing data for encoding and decoding voice, data, control, or other signals that may be transmitted or received by conversion device 100. The processor 103 may further include one or more of a microprocessor 113 and digital signal processor (DSP) 119 coupled, by the common data and address bus 117, to the encoder/decoder 111 and to one or more memory devices, such as a read only memory (ROM) 114, a random access memory (RAM) 104, and a static memory 116. One or more of ROM 114, RAM 104 and flash memory 116 may be included as part of processor 103 or may be separate from, and coupled to, the processor 103. The encoder/decoder 111 may be implemented by microprocessor 113 or DSP 119, or may be implemented by a separate component of the processor 103 and coupled to other components of the processor 103 via bus 117.

Communications unit 102 may include an RF interface 109 configurable to communicate with network components, and other user equipment within its communication range. Communications unit 102 may include one or more broadband and/or narrowband transceivers 108, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 102 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 110 that is coupled to the encoder/decoder 111.

Figure 2A:
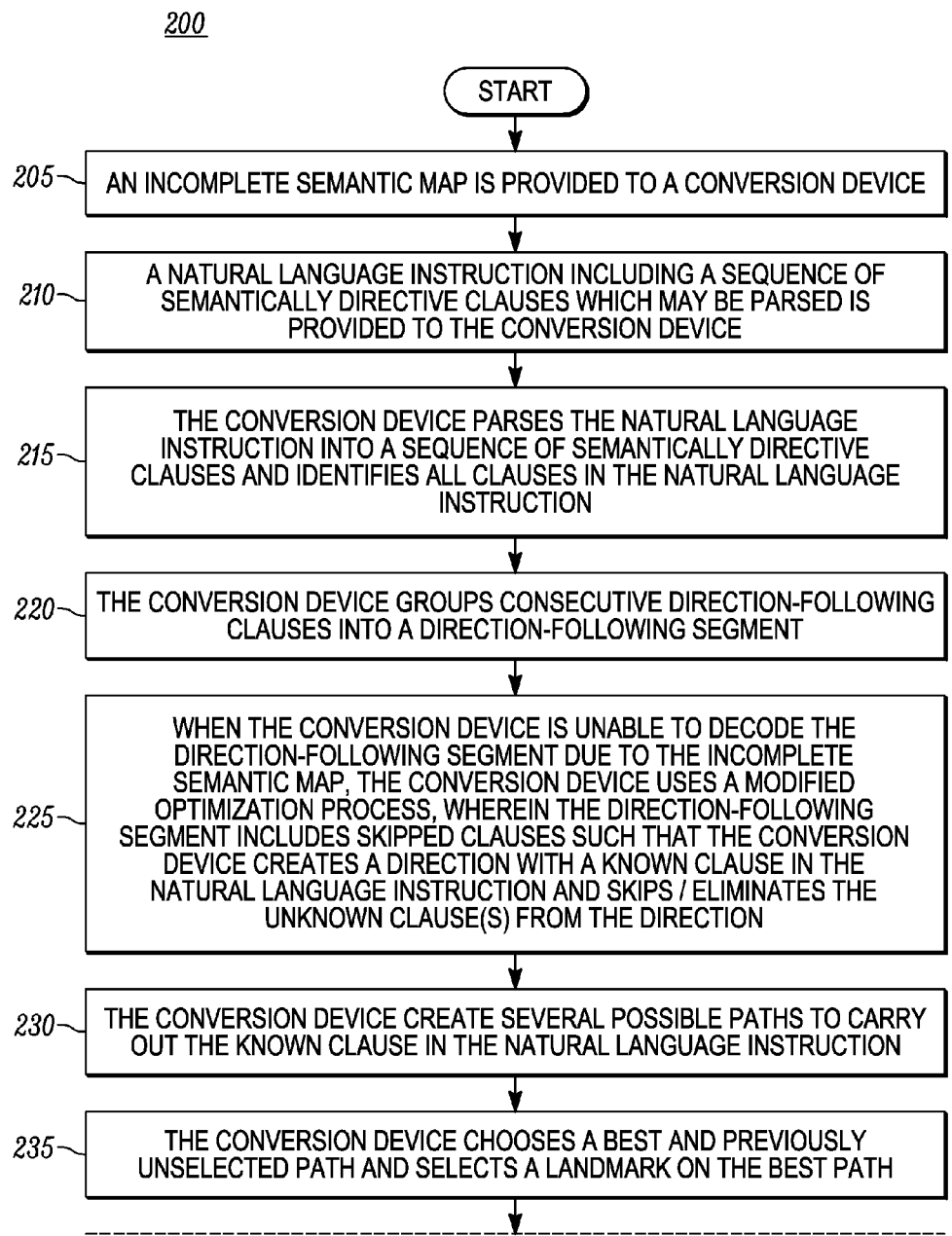
FIG. 2A and FIG. 2B represent a flow diagram implemented in accordance with some embodiments.
Figure 2B:
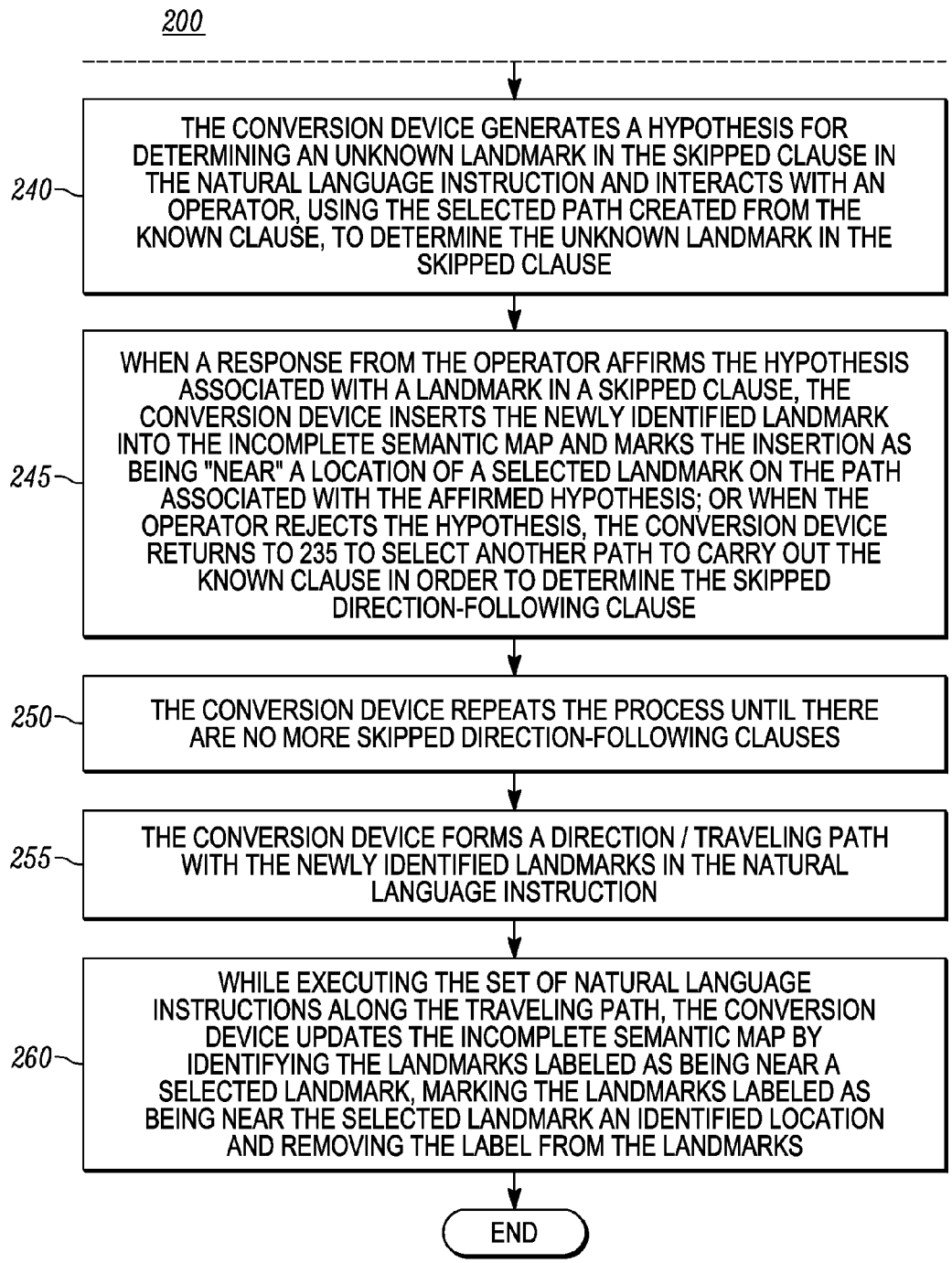
Figure 3:
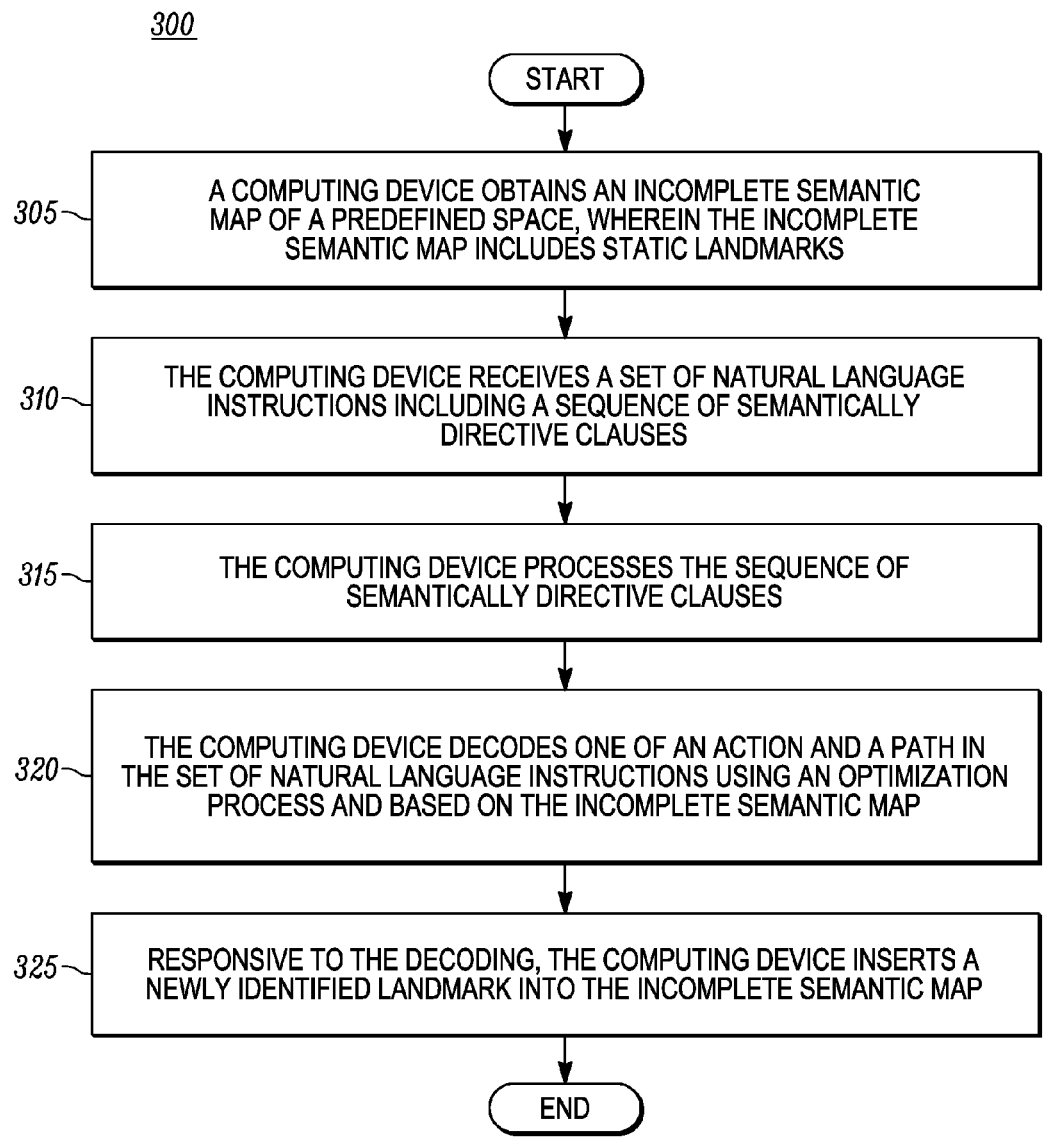
FIG. 3 is another flow diagram of a method implemented in accordance with some embodiments.

The one or more memory devices 112, 114, 116 are configured to store non-transitory computer-executable instructions and code for decoding or encoding data such as control, request, or instruction messages, channel change messages, and/or data or voice messages that may be transmitted or received by conversion device 100 and other programs and instructions that, when executed by the processor 103, provide for the device 100 to perform a set of functions and operations in response to executing the instructions described herein as being performed by such a device, such as the implementation of the encoder/decoder 111 and one or more of the steps set forth in FIGS. 2 and 3.

Consider an example where conversion device 100 may obtain a basic geographical layout of a predefined space (for example, an incomplete semantic map of a retail store), wherein the incomplete semantic map includes static landmarks such as doors, window, stairway, and other landmarks that cannot be easily changed. Assume that an operator of conversion device 100 also provides a set of natural language instructions to conversion device 100 and that the set of natural language instructions includes a sequence of semantically directive clauses, which may be processed and parsed using, for example, natural language processing technology. The sequential order for parsing the semantically directive clauses may be from left-to-right. In other words, in the set of natural language instructions, the clause in the left is to be executed before the clause to the right. The clauses may be classified as, for example, direction-following clause(s) or direction clause(s) or task execution clause(s).

If an example of the set of natural language instructions includes instructions stating "you should go straight; then turn right at the hardware sign to help the customer," conversion device 100 is configured to parse the set of natural language instructions into a sequence of semantically directive clauses using, for example, natural language processing technology. In parsing the set of natural language instructions, conversion device 100 is configured to identify clauses in the set of natural language instructions, i.e., conversion device 100 is configured to identify the direction-following clauses and the task execution clause in the set of natural language instructions.

Conversion device 100 classifies the identified clauses as, for example, direction-following clause(s) (for example, "you should go straight" and "turn right at the hardware sign") or task execution clause (for example, help the customer). Conversion device 100 groups the consecutive direction-following clauses into a direction-following segment. Each direction-following clause may include at least one of: a subject phrase (for example, you); a verb phrase (for example, should go straight, go through, turn right, go around or go by); a landmark phrase (for example, the hardware sign, aisle 5, an elevator or a door); and a verb-landmark relationship (for example, go straight through aisle 5 (where "go straight through" is the verb phrase and aisle 5 is the landmark phrase). Each task execution clause may include at least one of: a task name (for example, help the customer); a verb phrase (for example, help); and an object phrase (for example, the customer).

A current direction-following probabilistic optimization process which is widely used in executing natural language direction, provides that $$a = \underset{a}{\operatorname{argmax}}\, p(L, A \mid M) \hat{=} \underset{a,s}{\operatorname{argmax}}\, p(L, S \mid M) \times p(A \mid S) \times p(S),$$

wherein, A are programmable actions of the conversion device; L is a segment of direction-following clauses; S are all of paths in a map; and M is map model, M={N, E, O}, where N are nodes of landmarks, E are edges connecting all of nodes, and O are detectable observations of each of landmarks (e.g., the observations could be visual object detection from camera in different angles of a landmark).

In an embodiment, rather than using a "complete" semantic map, M, (i.e., a detailed geographical layout of a space with all static and dynamic landmarks clearly identified) conversion device 100 starts off with an "incomplete" semantic map, M, (i.e., a geographical layout of a space with all static and dynamic landmarks not clearly identified). Based on the incomplete semantic map, conversion device 100 decodes one of an action and a path in the set of natural language instructions. When conversion device 100 is unable to decode an action and/or a path in the set of natural language instructions due to the incomplete semantic map, conversion device 100 uses a modified optimization process, $$\underset{s}{\operatorname{argmax}}\ p(L, S \mid M) \hat{=} \underset{s,l}{\operatorname{argmax}}\ p(l, S \mid M) \times p(l \mid L) \times p(L),$$

where l is a version of the natural language segment of direction-following clauses, L, with some of clauses skipped; and p(l|L) is known as heuristic probabilistic penalty for skipped clauses. The modified optimization process can be realized by, for instance, Viterbi level building process.

Using the modified optimization process and the incomplete geographical layout presented to conversion device 100, conversion device 100 may identify a known landmark and/or a known task. For instance, conversion device 100 can determine how to execute the "go straight" clause based on the incomplete geographical layout presented to conversion device 100, making the "go straight" clause a known clause. However, using an example where the incomplete geographical layout only includes static landmarks such as doors, window, stairway, conversion device 100 will be unable to execute the direction-following clause for "turning right at the hardware sign", making the "turn right at the hardware sign" instruction an unknown clause. In other words, using the incomplete geographical layout, conversion device 100 will be unable to execute the direction-following clause for "turning right at the hardware sign" because conversion device 100 does not know where the hardware sign is in the geographical layout at this point.

Conversion device 100 creates a direction with the known clause (i.e., the "go straight" clause) in the set of natural language instructions and skips/eliminates, from the direction, the unknown clause(s) (for example, "turn right at the hardware sign" clause) in the set of natural language instructions. Conversion device 100 creates at least one path to execute the known clause (i.e., the "go straight" clause). Choosing, from the at least one path, a best and previously unselected path decoded using the above modified optimization process, conversion device 100 may select a landmark on the best path, wherein the selected landmark may be known from the incomplete semantic map but may not be mentioned in the natural language direction-following clauses.

Based on the selected best path, conversion device 100 generates a hypothesis for determining an unknown landmark in the skipped/eliminated clause in the set of natural language instructions and interacts with the operator to identify the unknown landmark in the skipped clause. For instance, using the best path selected from the known clause (i.e., the "go straight" clause), conversion device 100 generates hypothesis for identifying the hardware sign in the skipped clause (i.e., the hardware sign in the "turn right at the hardware sign" clause).

Conversion device 100 may use a natural language query to obtain information from the operator about a relationship between the unknown landmark in the eliminated clause and a selected landmark. For instance, if the best path selected from the "go straight" clause is to go straight near the entrance (where the entrance is a landmark that is selected by conversion device 100), conversion device 100 may query the operator to determine if the hardware sign (i.e., the unknown landmark in the natural language instructions) is near the entrance. If the response to the query indicates that the hardware sign is not near the entrance, conversion device 100 may select a second best and previously unselected path, select a landmark on the second best path, generate a hypothesis for determining hardware sign and interact with the operator to determine if hardware sign is associated with the second best path. For instance, if the second best path is to go straight on aisle 5 (where aisle 5 is the selected landmark), conversion device 100 may query the operator to determine if the hardware sign is at the end of aisle 5. Conversion device 100 may continue to query the operator until the unknown landmark in the skipped clause (i.e., the hardware sign) is identified using a selected landmark.

When a response from the operator affirms a hypothesis of one of the possible paths, conversion device 100 inserts the newly identified landmark (for example, the hardware sign) into the incomplete semantic map and marks the insertion as being "near" the location of a selected landmark. Using the example where the operator affirms the hypothesis that the hardware sign is at the end of aisle 5, conversion device 100 may insert the newly identified hardware sign into the incomplete semantic map and mark the insertion as being "near" aisle 5. Conversion device 100 repeats the modified optimization process until there is no eliminated clause in the set of natural language instructions or there are no more skipped direction-following clauses.

Conversion device 100 forms a direction/traveling path with the newly identified landmarks and identifies task-performing actions in the set of natural language instructions. Along the traveling path, there may be landmarks labeled as being "near" a selected landmark. While executing the set of natural language instructions along the traveling path, conversion device 100 uses its image capturing capability, for instance, to capture and identify the landmarks labeled as being "near" a selected landmark. Then, conversion device 100 marks a landmark labeled as being "near" a selected landmark as an identified location and conversion device 100 removes the "near" indication from the landmarks. This updates the semantic map for upcoming use by conversion device 100 or by other conversion devices.

FIG. 2 is a flow diagram of a method 200 implemented in accordance with some embodiments. At 205, an incomplete semantic map is provided to a conversion device. At 210, a natural language instruction including a sequence of semantically directive clauses which may be parsed is provided to the conversion device. At 215, the conversion device parses the natural language instruction into a sequence of semantically directive clauses and identifies all clauses in the natural language instruction, i.e., the direction-following clauses and the task execution clauses in the natural language instruction.

At 220, the conversion device groups consecutive direction-following clauses into a direction-following segment. At 225, when the conversion device is unable to decode the direction-following segment due to the incomplete semantic map, the conversion device uses a modified optimization process, wherein the direction-following segment includes skipped clauses such that the conversion device creates a direction with a known clause in the natural language instruction and skips/eliminates the unknown clause(s) from the direction. At 230, the conversion device creates several possible paths to carry out the known clause in the natural language instruction. At 235, the conversion device chooses/selects a best and previously unselected path and selects a landmark on the best path.

At 240, the conversion device generates a hypothesis for determining an unknown landmark in the skipped clause in the natural language instruction and interacts with an operator, using the selected path created from the known clause, to determine the unknown landmark in the skipped clause. At 245, when a response from the operator affirms the hypothesis associated with a landmark in a skipped clause, the conversion device inserts the newly identified landmark into the incomplete semantic map and marks the insertion as being "near" a location of a selected landmark on the path associated with the affirmed hypothesis; or when the operator rejects the hypothesis, the conversion device returns to 235 to select another path to carry out the known clause in order to determine the skipped direction-following clause. At 250, the conversion device repeats the process until there are no more skipped direction-following clauses.

At 255, the conversion device forms a direction/traveling path with the newly identified landmarks in the natural language instruction. At 260, while executing the set of natural language instructions along the traveling path, the conversion device updates the incomplete semantic map by identifying the landmarks labeled as being near a selected landmark, marking the landmarks labeled as being near the selected landmark an identified location and removing the label from the landmarks.

FIG. 3 is a flow diagram of a method implemented in accordance with some embodiments. At 305, a computing device obtains an incomplete semantic map of a predefined space, wherein the incomplete semantic map includes static landmarks. At 310, the computing device receives a set of natural language instructions including a sequence of semantically directive clauses. At 315, the computing device processes the sequence of semantically directive clauses. At 320, the computing device decodes one of an action and a path in the set of natural language instructions using an optimization process and based on the incomplete semantic map. At 325, responsive to the decoding, the computing device inserts a newly identified landmark into the incomplete semantic map.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method, comprising:
    obtaining, by a computing device, an incomplete semantic map of a predefined space, wherein the incomplete semantic map includes static landmarks;
    receiving, by the computing device, a set of natural language instructions including a sequence of semantically directive clauses;
    processing, by the computing device, the sequence of semantically directive clauses;
    decoding, by the computing device, one of an action and a path in the set of natural language instructions using an optimization process and based on the incomplete semantic map;
    responsive to the decoding, inserting, by the computing device, a newly identified landmark into the incomplete semantic map;
    executing, by the computing device, the set of natural language instructions along a traveling path;
    detecting, by the computing device, the newly identified landmark; and
    responsive to the detecting of the newly identified landmark, marking, by the computing device, the newly identified landmark as an identified location.

2. The method of claim 1, wherein the processing comprises:
    parsing the sequence of semantically directive clauses from left-to-right;
    identifying clauses in the sequence of semantically directive clauses; and
    classifying the clauses.

3. The method of claim 2, wherein the classifying comprises classifying the clauses as one of direction-following clauses and task execution clauses.

4. The method of claim 1, wherein the decoding comprises:
    identifying one of a known landmark and a known task in the set of natural language instructions;
    creating a direction with a known clause in the set of natural language instructions; and
    eliminating an unknown clause in the set of natural language instructions from the direction.

5. The method of claim 4, further comprising:
    creating at least one path to execute the known clause;
    choosing a best and previously unselected path from the at least one path and selecting a landmark on the best and previously unselected path, wherein the selected landmark is known from the incomplete semantic map;
    generating a hypothesis for determining an unknown landmark in an eliminated clause in the set of natural language instructions;
    interacting with an operator to identify the unknown landmark in the eliminated clause;
    wherein the inserting the newly identified landmark into the incomplete semantic map is responsive to the operator affirming the hypothesis; and
    responsive to the operator rejecting the hypothesis, repeating choosing, generating and interacting.

6. The method of claim 5, wherein the interacting comprises using a natural language query to obtain information from the operator about a relationship between the unknown landmark in the eliminated clause and the selected landmark.

7. The method of claim 1, wherein the inserting comprises marking the newly identified landmark as associated with a location of a selected landmark.

8. The method of claim 1, further comprising forming the traveling path with the newly identified landmark in the set of natural language instructions.

9. A computing device, comprising:
    memory configured to store non-transitory computer-executable instructions; and
    a processor configured to perform a set of functions including:
        obtaining an incomplete semantic map of a predefined space, wherein the incomplete semantic map includes static landmarks;
        receiving a set of natural language instructions including a sequence of semantically directive clauses;
        processing the sequence of semantically directive clauses;
        decoding one of an action and a path in the set of natural language instructions using an optimization process and based on the incomplete semantic map;
        responsive to the decoding, inserting a newly identified landmark into the incomplete semantic map;
        executing the set of natural language instructions along a traveling path;
        detecting the newly identified landmark; and
        responsive to the detecting of the newly identified landmark, marking the newly identified landmark as an identified location.

10. The computing device of claim 9, wherein the processor is further configured to:
    parse the sequence of semantically directive clauses from left-to-right;
    identify clauses in the sequence of semantically directive clauses; and
    classify the clauses.

11. The computing device of claim 10, wherein the classifying comprises classifying the clauses as one of direction-following clauses and task execution clauses.

12. The computing device of claim 9, wherein the decoding comprises:
    identifying one of a known landmark and a known task in the set of natural language instructions;
    creating a direction with a known clause in the set of natural language instructions; and
    eliminating an unknown clause in the set of natural language instructions from the direction.

13. The computing device of claim 12, wherein the processor is further configured to:
    create at least one path to execute the known clause;
    choose a best and previously unselected path from the at least one path and selecting a landmark on the best and previously unselected path, wherein the selected landmark is known from the incomplete semantic map;
    generate a hypothesis for determining an unknown landmark in an eliminated clause in the set of natural language instructions;
    interact with an operator to identify the unknown landmark in the eliminated clause;
    wherein the inserting of the newly identified landmark into the incomplete semantic map is responsive to the operator affirming the hypothesis; and
    responsive to the operator rejecting the hypothesis, repeat choosing, generating and interacting.

14. The computing device of claim 13, wherein the interacting comprises using a natural language query to obtain information from the operator about a relationship between the unknown landmark in the eliminated clause and the selected landmark.

15. The computing device of claim 9, wherein the inserting comprises marking the newly identified landmark as associated with a location of a selected landmark.

16. The computing device of claim 9, wherein the processor is further configured to form the traveling path with the newly identified landmark in the set of natural language instructions.

17. A method comprising
   obtaining, by a computing device, an incomplete semantic map of a predefined space, wherein the incomplete semantic map includes static landmarks;
   receiving, by the computing device, a set of natural language instructions including a sequence of semantically directive clauses;
   processing, by the computing device, the sequence of semantically directive clauses;
   decoding, by the computing device, one of an action and a path in the set of natural language instructions using an optimization process and based on the incomplete semantic map;
   identifying, by the computing device, one of a known landmark and a known task in the set of natural language instructions;
   creating, by the computing device, a direction with a known clause in the set of natural language instructions;
   eliminating, by the computing device, an unknown clause in the set of natural language instructions from the direction;
   creating, by the computing device, at least one path to execute the known clause;
   choosing, by the computing device, a best and previously unselected path from the at least one path and selecting a landmark on the best and previously unselected path, wherein the selected landmark is known from the incomplete semantic map;
   generating, by the computing device, a hypothesis for determining an unknown landmark in an eliminated clause in the set of natural language instructions;
   interacting with an operator to identify the unknown landmark in the eliminated clause;
   responsive to the operator affirming the hypothesis, inserting a newly identified landmark into the incomplete semantic map; and
   responsive to the operator rejecting the hypothesis, repeating choosing, generating and interacting.

18. A computing device comprising:
   memory configured to store non-transitory computer-executable instructions; and
   a processor configured to perform a set of functions including:
      obtaining an incomplete semantic map of a predefined space, wherein the incomplete semantic map includes static landmarks;
      receiving a set of natural language instructions including a sequence of semantically directive clauses;
      processing the sequence of semantically directive clauses;
      decoding one of an action and a path in the set of natural language instructions using an optimization process and based on the incomplete semantic map;
      identifying one of a known landmark and a known task in the set of natural language instructions;
      creating a direction with a known clause in the set of natural language instructions;
      eliminating an unknown clause in the set of natural language instructions from the direction;
      creating at least one path to execute the known clause;
      choosing a best and previously unselected path from the at least one path and selecting a landmark on the best and previously unselected path, wherein the selected landmark is known from the incomplete semantic map;
      generating a hypothesis for determining an unknown landmark in an eliminated clause in the set of natural language instructions;
      interacting with an operator to identify the unknown landmark in the eliminated clause;
      responsive to the operator affirming the hypothesis, inserting a newly identified landmark into the incomplete semantic map; and
      responsive to the operator rejecting the hypothesis, repeating choosing, generating and interacting.

* * * * *